United States Patent [19]

Sato

[11] Patent Number: 5,253,795

[45] Date of Patent: Oct. 19, 1993

[54] MANUFACTURING METHOD FOR BATTERY TERMINAL

[75] Inventor: Masakazu Sato, Takatsuki, Japan

[73] Assignee: Yuasa Battery Co., Ltd., Osaka, Japan

[21] Appl. No.: 925,183

[22] Filed: Aug. 6, 1992

[30] Foreign Application Priority Data

Aug. 20, 1991 [JP] Japan .................................. 3-233883

[51] Int. Cl.$^5$ .............................................. B23K 31/02
[52] U.S. Cl. .................................. 228/174; 228/222; 228/901; 29/623.4; 29/730
[58] Field of Search ................ 228/901, 222, 174, 50; 29/730, 623.4, 623.2

[56] References Cited

U.S. PATENT DOCUMENTS 1,784,216  12/1930  Aldrich et al. ...................... 29/623.2
4,272,592   6/1981  Miyagawa ........................... 29/623.2

FOREIGN PATENT DOCUMENTS 59-23455  2/1984  Japan .................................. 29/623.2
59-86154  5/1984  Japan .................................. 29/623.2

Primary Examiner—Kurt C. Rowan
Assistant Examiner—Jeffrey T. Knapp
Attorney, Agent, or Firm—Armstrong, Westerman, Hattori, McLeland & Naughton

[57] ABSTRACT

A plate of a battery is positioned so that a strap connected to the plate is located on a side of the plate, and a pedestal of a resin-wrapped post is fit in a notch formed in the strap. A first protection plate is installed between a contact portion of the pedestal with the notch and a resin portion of the resin-wrapped post, and a second protection plate is installed between the contact portion and the plate. A flame of a burner is applied onto the contact portion from above the strap and the pedestal at a spot between the both protection plates so as to weld the pedestal to the strap without causing the resin portion to become molten or the post from becoming misshapen.

1 Claim, 2 Drawing Sheets

MANUFACTURING METHOD FOR BATTERY TERMINAL

BACKGROUND OF THE INVENTION

1. Field of the Invention

This invention relates to a manufacturing method for a battery terminal wherein a resin-wrapped post, which is molten at a resin portion to a backside of a cover to form the terminal, is welded to a strap.

2. Description of the Related Art

FIG. 4 is a sectional view showing one working process of a conventional manufacturing method for welding a resin-wrapped post to a strap. 4 denotes a resin-wrapped post, and 5 denotes a strap. The resin-wrapped post 4 is a member comprising a post body 2 and a pedestal 1 integrated into an L-shape. The post body 2 is wrapped with resin by injection molding in order to secure liquid-tightness, so as to form a resin portion 3. The strap 5 connects plural lugs 10a of plates 10. In the process shown in FIG. 4, the pedestal 1 is put in contact with the strap 5 in a horizontal position by patching a protection plate 6 from lower side, and a flame of a burner 8 is applied on a contact portion 7 from upper side so as to weld the pedestal 1 to the strap 5.

In the above-mentioned conventional method, however, there have been following problems (1) through (3) in case when distances of FIG. 4 are small such as a: about 2 mm and b: about 3 mm. In this instance, the distance a is a distance from a bottom end of the resin portion 3 to an upper face of the pedestal 1, and the distance b is a distance from a center of the post body 2 to a tip end of the pedestal 1.

(1) The bottom end of the resin post 3 is molten by the flame of the burner 8, so that the liquid-tightness of the terminal composed of the resin-wrapped post 4 can not be maintained.

(2) When it is intended to avoid the melting of the resin post 3, the welding of the pedestal 1 to the strap 5 cannot be carried out satisfactorily.

(3) Since an area of a part of the pedestal 1 on which the flame of the burner 8 is applied is large, the pedestal 1 is quickly molten and misshapen. For this reason, the welding can not be carried out completely.

SUMMARY OF THE INVENTION

This invention is made with an intention to solve the above problems, and an object of this invention is to provide a method for preventing the resin portion of the resin-wrapped post from being molten and, at the same time, for enabling a complete welding of the pedestal of the resin-wrapped post to the strap.

This invention provides a manufacturing method for a battery terminal, in which a notch is previously formed on the strap, the notch being made from an upper-face side to a side-face side opposite to a plate when the plate is brought down so as to locate the strap at its side position, the pedestal of the resin-wrapped post is fit in the notch in such a manner that the post body is in a state of extending to an opposite side of the plate at a right angle to the strap, a first protection plate interrupting the following two portions is installed between a contact portion of the pedestal with the notch and the resin portion of the resin-wrapped post, a second protection plate is installed between the contact portion and the plate, the flame of the burner is applied on the contact portion from upper side at a spot between the both protection plates so as to weld the pedestal to the strap, and the plate is previously brought down so as to locate the strap at its side position at any time of the welding or a working stage up to the welding.

In the method of this invention, a distance between the contact portion to be welded and the resin portion becomes long. Further, the resin portion is interrupted by the first protection plate from the contact portion. Moreover, the flame of the burner is applied from upper side so that this flame spreads to both sides only within a small area. Accordingly, the resin portion is not molten by the flame of the burner. In addition, the area of the part of the pedestal on which the flame is applied becomes small, so that the welding can be carried out before the pedestal has been molten such a degree as to become misshapen. Therefore, the pedestal is welded to the strap securely.

DESCRIPTION OF THE PREFERRED EMBODIMENT

Figure 1:
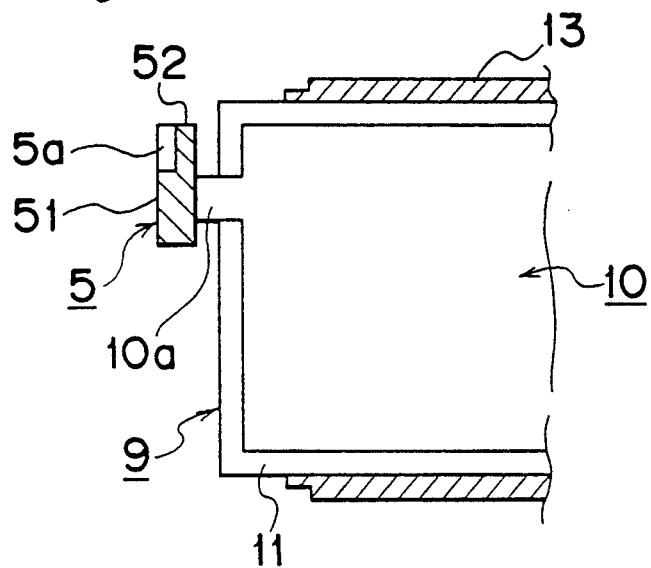
FIG. 1 is a sectional view showing a strap to which a resin-wrapped post is welded by a manufacturing method of this invention.

FIG. 1 is the sectional view showing the strap to which the resin-wrapped post is welded by the manufacturing method of this invention. The strap 5 is so installed as to connect plural lugs 10a of plates 10, and formed into a plate-like shape. The plates 10 are laminated alternately with separators 11 to form an assembled element 9. A notch 5a is formed on the strap 5. The notch 5a is made over a range from an upper-face 52 side to a side-face 51 side opposite to the plate 10 when the plate 10 is brought down so as to locate the strap 5 at its side position as illustrated by FIG 1. The notch 5a has a size and shape approximately similar to those of a pedestal 1 of a resin-wrapped post 4 which will be described later, and formed into such a shape that the post body 2 of the resin-wrapped post 4 is in a state of extending to an opposite side of the assembled element 9 at a right angle to the strap 5 when the pedestal 1 is fit in the notch 5a. 13 is a container made of thermoplastic resin which houses the assembled element 9. In FIG. 1, the assembled element 9 is in the brought-down state so as to locate the strap 5 at its side position.

Figure 2:
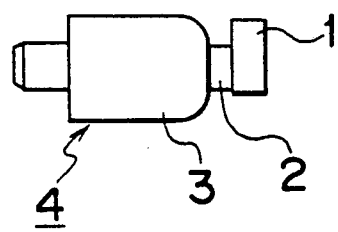
FIG. 2 is a front view showing the resin-wrapped post welded to the strap by the manufacturing method of this invention.
Figure 4:
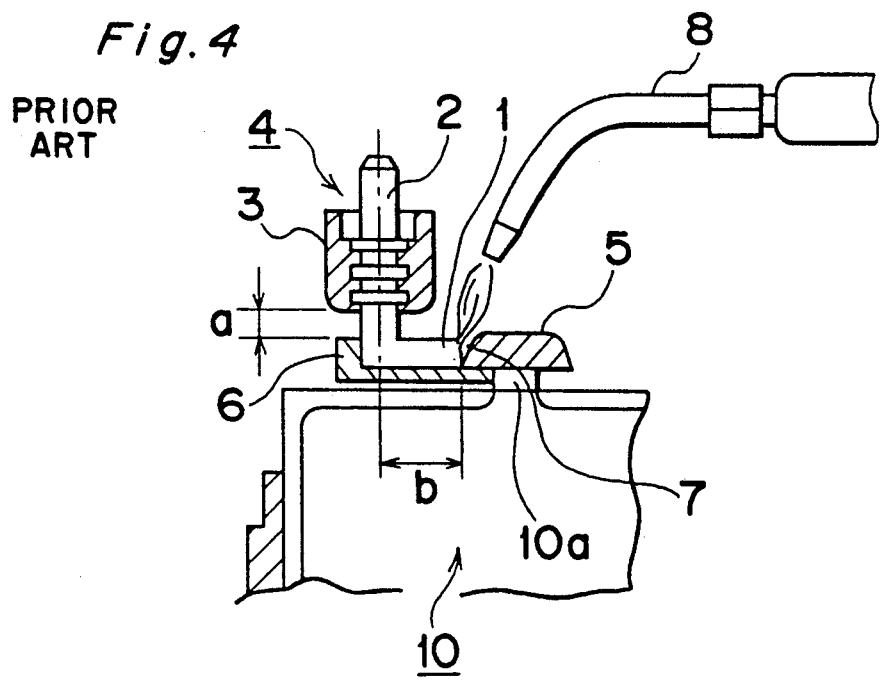
FIG. 4 is a sectional view showing one process of conventional method for welding the resin-wrapped post welded to the strap.

FIG. 2 is the front view showing the resin-wrapped post 4 welded to the strap 5 shown in FIG. 1. The resin-wrapped post 4 is the same one as illustrated in FIG. 4, and same or similar parts and members of FIG. 2 bear same reference numbers as those in FIG. 4. In FIG. 2, the resin-wrapped post 4 is in a state of being brought down in a horizontal position.

Figure 3:
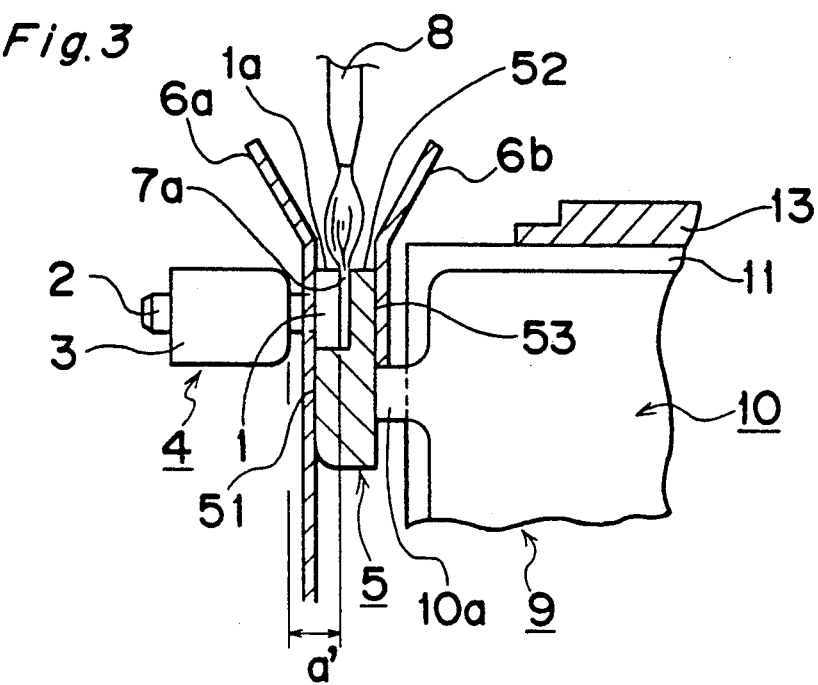
FIG. 3 is a sectional view showing one process of the manufacturing method of this invention.

FIG. 3 is the sectional view showing one working process of the method of this invention, and shows a working process of welding the resin-wrapped post 4 shown in FIG. 2 is welded to the strap 5 shown in FIG. 1 by a burner 8. This work is done in the following way. In the first place, the pedestal 1 of the resin-wrapped post 4 in the state of FIG. 2 i.e. the brought-down state is made fit in the notch 5a of the strap 5 in the state of FIG. 1 i.e. the brought-down state of the assembled element 9. In this instance, the post body 2 of the resin-wrapped post 4 is in a state of extending to the opposite side of the assembled element 9 at a right angle to the strap 5. In the next place, a protection plate 6a interrupting the following both portions is installed between a contact portion 7a of the pedestal 1 with the notch 5a and a resin portion 3, and a protection plate 6b is installed between the contact portion 7a and the assembled element 9. The protection plate 6a extends along the side face 51 of the strap 5 in a vertical direction, and the protection plate 6b extends to upper side along the side face 53 opposite to the side face 51 of the strap 5. A distance between the protection plate 6a and the protection plate 6b becomes large as they go to upper side. In the third place, a flame of the burner 8 is applied from upper side onto the contact portion 7a at a spot between the protection plate 6a and the protection plate 6b so as to weld the pedestal 1 to the strap 5. After completion of the welding, the both protection plates 6a and 6b are removed, the assembled element 9 is returned from the brought-down position to an upright position. The welded resin-wrapped post 4 is molten to a backside of cover at the resin portion 3 so that a terminal is formed.

In the above-mentioned working process, a distance between the resin portion 3 and the contact portion 7a is lengthened as shown by a distance a' of FIG. 3. In this instance, the distance a' is a horizontal distance in FIG. 3 from a bottom end of the resin portion 3 to the contact portion 7a. Further, the resin portion 3 is interrupted from the contact portion 7a by the protection plate 6a. Moreover, since the flame of the burner 8 is applied from upper side, the flame spreads to both sides within a small area. Accordingly, the resin portion 3 is not molten by the flame of the burner 8. In addition, the part of the pedestal 1 to which the flame of the burner 8 is applied is minimized to only a part 1a along the upper face 52 of the strap 5, and this part 1a is small so that the welding can be carried out before the pedestal 1 has been molten to get out of shape. Therefore, the pedestal 1 is welded to the strap 5 securely. The distance between the protection plate 6a and the protection plate 6b becomes large as they go to upper side, so that the flame of the burner 8 can be applied easily from upper side.

Consequently, according to the present invention, the resin portion 3 is not molten by the flame of the burner 8, so that the liquid-tightness of the terminal can be maintained even when the resin-wrapped post 4 is small one. Further, since the pedestal 1 can be welded to the strap 5 securely, the stable terminal can be formed.

In the foregoing work, the assembled element 9 is put under the brought-down state before the pedestal 1 of the resin-wrapped post 4 is fit in the notch 5a of the strap 5. However, it is enough to put the assembled element 9 into the brought-down state at time when the flame of the burner 8 is applied, so that the work is not necessarily limited to the mentioned work procedure.

Moreover, the shape of the strap 5 is not necessarily limited to the above-mentioned plate-like shape.

What is claimed is:

1. A method for manufacturing a battery terminal, including a strap connecting one of a plurality of lugs of a plurality of plates and a resin-wrapped post having a post body and a pedestal integrated into an L-shape, the post body being wrapped with a resin in order to secure liquid-tightness, comprising the steps of:

forming a notch in the strap, the notch running from an upper-face side to a side-face side opposite the plates connected to the strap when the plates are positioned such as to locate the strap on a side of the plates;

fitting the pedestal of the resin-wrapped post in the notch in such a manner that the post body extends to an opposite side of one of the pates at a right angle to the strap;

installing a first protection plate between a contact portion of the pedestal with the notch and the resin portion of the resin-wrapped post;

installing a second protection plate between the contact portion and one of the plates;

applying a flame of a burner on the contact portion from above the strap and the pedestal at a spot between the first protection plate and the second protection plate, thereby welding the pedestal to the strap without causing the resin portion to become molten or the post from becoming misshapen.

* * * * *